Nov. 4, 1969  P. VILLAIN  3,476,844
PROCESS FOR PRODUCING ARTIFICIAL SPONGES
Filed Dec. 20, 1965

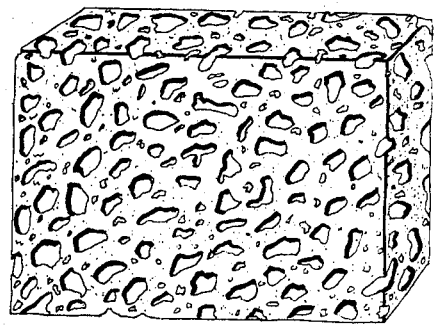

COMPRESS UNDER PRESSURE MASSES OF CRYSTALLINE PORE-FORMING MATERIAL INTO AGGLOMERATES

↓

INCORPORATE AGGLOMERATES INTO A PLASTIC HARDENABLE SYNTHETIC SPONGE FORMING MATERIAL

↓

HARDEN INTO SPONGE FORM

↓

REMOVE PRE-FORMING MATERIAL TO LEAVE PORES OF WELL DEFINED CONFIGURATION CONFORMING TO THE AGGLOMERATES

INVENTORS
PIERRE VILLAIN

:::
United States Patent Office 3,476,844
Patented Nov. 4, 1969

---

3,476,844
PROCESS FOR PRODUCING ARTIFICIAL
SPONGES
Pierre Villain, Beauvais, France, assignor to Novacel S.A.,
Paris, France, a corporation of France
Filed Dec. 20, 1965, Ser. No. 515,175
Int. Cl. B29d 27/06
U.S. Cl. 264—49
8 Claims

ABSTRACT OF THE DISCLOSURE

A method of producing an artificial sponge containing pores of approximately the same dimensions as the pores of natural sponge, said artificial sponge having improved wiping qualities, which process comprises compressing masses of soluble crystalline pore-forming material to agglomerate the same and incorporating such agglomerates in a plastic hardenable synthetic sponge forming material, e.g., regenerated cellulose, with subsequent removal of the agglomerate by fusion or washing to leave pores of well-defined configuration.

---

This invention is concerned with improvements in and relating to the manufacture of synthetic sponges.

It is known to manufacture synthetic sponges, for example from regenerated cellulose, cellulose derivatives or polyvinyl alcohol, using to produce the pores in the sponge soluble or fusible pore-producing materials which are incorporated in a sponge matrix which is caused to solidify, and then are removed leaving the pores. Thus a well-known method for the manufacture of these sponges consists in preparing a paste composed of viscose containing cotton fibers or hemp fibers or any other type as reinforcing material, and crystals of sodium sulphate decahydrate, which is very soluble in water and easily fusible; the paste thus formed is extruded into moulds, coagulated, fixed and washed to form a porous mass of regenerated cellulose, to which the usual finishing treatments are applied.

The porosity of the sponges obtained depends on the size of the hydrated sodium sulphate crystals used as pore-producing material. Large crystals are obtained by slow crystallization of solutions of sodium sulphate and are very often composed of an agglomeration of relatively small crystals, thus producing cavities and irregularities which make the resultant mass rather fragile. These crystals have a low resistance to the stresses to which they are subjected during the mixing and extruding operations involved in the manufacture of sponges made of regenerated cellulose material; they break and thus limit the porosity potential of these sponges. In addition, because of the irregularity of their dimensions and surface, they produce irregular cells with walls which are not clean-cut and are often badly shaped.

The output of large crystals of hydrated sodium sulphate is reduced by the formation of powdery particles during mixing, which are no longer efficacious for the formation of the pores.

The present invention provides a process for the manufacture of synthetic sponges, wherein as pore-producing material there is used agglomerated crystalline masses obtained by compression of an easily soluble or fusible material suitable for pore production and of crystal form.

By agglomeration there can be produced hard, regular crystals, which are resistant to the stresses imposed during the various manufacturing operations.

The method is of particular interest in the case of synthetic sponges of regenerated cellulose from viscose and of agglomerated hydrated sodium sulphate crystals as pore-producing materials.

Small-size crystals of hydrated sodium sulphate can be compressed by machines of the usual type, e.g., agglomerating apparatus known for coal-dust pellets, where the crystals pass between two compression drums which have depressions in the surfaces corresponding to the shape of the agglomerates that it is desired to obtain. Under the effect of the pressure, partial fusion is produced on the surface of the individual crystals, so that during the recrystallization occurring when the mass is freed from pressure, the crystals forming the pore-producing mass can be consolidated to stronger products.

The hardness of the agglomerated pore-producing mass can be increased either by eliminating part of the hydration water or by incorporating anhydrous sodium sulphate, which thus increases the actual salt content of the mass.

The addition of anhydrous sodium sulphate also avoids adhesion of individual agglomerates of pore-reducing material to one another, which may otherwise occur when they come into contact after release of pressure.

Anhydrous sodium sulphate can be added in any suitable proportions limited by the solubility and fusion temperature of the mass obtained. The proportion may be between 0.5 and 15 percent, preferably between 3 and 8 percent.

The agglomerated pore-producing crystals can be of any suitable shape. It is an advantage to choose the tetrahedral form, being the most simple and, depending on the position of the pore-producing mass in the viscose, producing differently orientated pores, thereby achieving an advantageous effect.

The dimensions of these agglomerated crystals may also vary.

FIGURE 1 is a simplified flow diagram of the process of the present invention. As shown in FIGURE 1, the process comprises first, compressing under pressure, masses of crystalline pore-forming material so as to form agglomerates; incorporating the agglomerates into a plastic hardenable synthetic sponge forming material; hardening such material containing the agglomerates into a sponge form; and thereafter removing the pore-forming material to leave pores of well defined configuration conforming to the agglomerates.

A sponge produced in accordance with this process is pictorially illustrated as FIGURE 2.

The following example illustrates the invention:

EXAMPLE 10 kg. of hydrated sodium sulphate crystals passing through a 3 mm. screen are mixed with 0.75 kg. of anhydrous sodium sulphate and compressed under a pressure of 1.3 metric tons/sq. cm. between two cylinders which have depressions allowing the formation between them of tetrahedra having faces each of an area of 1 sq. cm.

The faces of the tetrahedra may be flat or curved.

The product produced is then kept, preferably for a minimum period of 2 hours, after leaving the agglomerating apparatus, at the end of which time the compressed shapes have acquired an increased rigidity. The product is then mixed with viscose containing fibrous reinforcing material. Thus 280 grams of viscose with 10 percent cellulose containing 30 grams of fibers cut into lengths of 7 cm. may be mixed with 400 grams of compressed sodium sulphate prepared according to the method described above. The paste thus obtained is then moulded, and the blocks are coagulated according to known methods and subjected to the usual finishing treatments.

In this manner, synthetic sponges made of regenerated cellulose are obtained in which the pores are of approximately the same dimensions as the pores of natural sponges and the cavities are well-formed, defined by a clean-cut "skin," which allows better absorption of aqueous liquids, thereby improving the wiping qualities, and better cleaning, since the dirt collected by the sponge does not penetrate deeply into it, but remains on the "skin." Sponges obtained by this method are also more supple.

In addition, this method allows the use of small crystals easily obtained by rapid crystallization of a hydrated sodium sulphate solution, and leads to improved output from the crystallization of the sodium sulphate. In fact, the whole of the hydrated and anhydrous sodium sulphate used in the manufacture of sponges made of regenerated cellulose is utilised for the formation of the pores.

Other dimensions and shapes could be used for the agglomerates, for example cubic crystals could be produced, although the tetrahedron gives better orientation effects. In place of hydrated sodium sulphate, any other fusible or easily soluble product can be used which is capable of producing under pressure, masses which are sufficiently solid to survive without breaking the various processes in the preparation of the paste used for the manufacture of regenerated cellulose sponges.

Although the invention has been described in particular for synthetic sponges made of regenerated cellulose, the invention can also be applied to synthetic sponges based on other absorbent materials, e.g., certain cellulose derivatives of polyvinyl alcohol.

What is claimed is:

1. The method of making artificial sponges which comprises compressing masses of soluble crystalline pore-forming material under a pressure suited to agglomerate the masses, incorporating the agglomerates in a plastic hardenable synthetic sponge forming material, hardening said material into sponge form and removing the pore-forming material by washing so as to leave pores of well-defined configuration conforming to said agglomerates.

2. The method set forth in claim 1 wherein the sponge-forming material comprises regenerated cellulose.

3. The method set forth in claim 1 in which the pore-forming material comprises agglomerated sodium sulphate decahydrate crystals.

4. The method set forth in claim 1 in which the pore-forming material comprises an agglomerate of sodium sulphate decahydrate crystals and anhydrous sodium sulphate.

5. The method set forth in claim 4 in which the anhydrous sodium sulphate comprises 0.5 to 15 percent of said agglomerate.

6. The method set forth in claim 4 in which the anhydrous sodium sulphate comprises 3 to 8 percent of said agglomerate.

7. The method set forth in claim 1 in which the agglomerates are tetrahedral in form.

8. A method of making artificial sponges which comprises compressing masses of easily fusible crystalline pore-forming material under a pressure suited to agglomerate the masses, incorporating the agglomerates in a plastic hardenable synthetic sponge forming material, hardening said material into sponge form and removing the pore-forming material by fusion so as to leave pores of well-defined configuration conforming to said agglomerates.

References Cited

UNITED STATES PATENTS

| | | | |
|---|---|---|---|
| 2,017,398 | 10/1935 | Faldini | 264—49 |
| 2,280,022 | 4/1942 | Banigan et al. | 264—49 |
| 2,773,286 | 12/1956 | Piccard et al. | 264—49 |
| 3,054,705 | 9/1962 | Mitchell et al. | 264—117 XR |
| 3,278,661 | 10/1966 | Beck | 264—117 XR |

PHILIP E. ANDERSON, Primary Examiner

U.S. Cl. X.R.

260—2.5; 264—117, 344